July 8, 1952     J. CLARK     2,602,329
EQUIPMENT FOR MEASURING PRESSURES NORMAL TO A BODY
Original Filed July 14, 1945     5 Sheets-Sheet 1
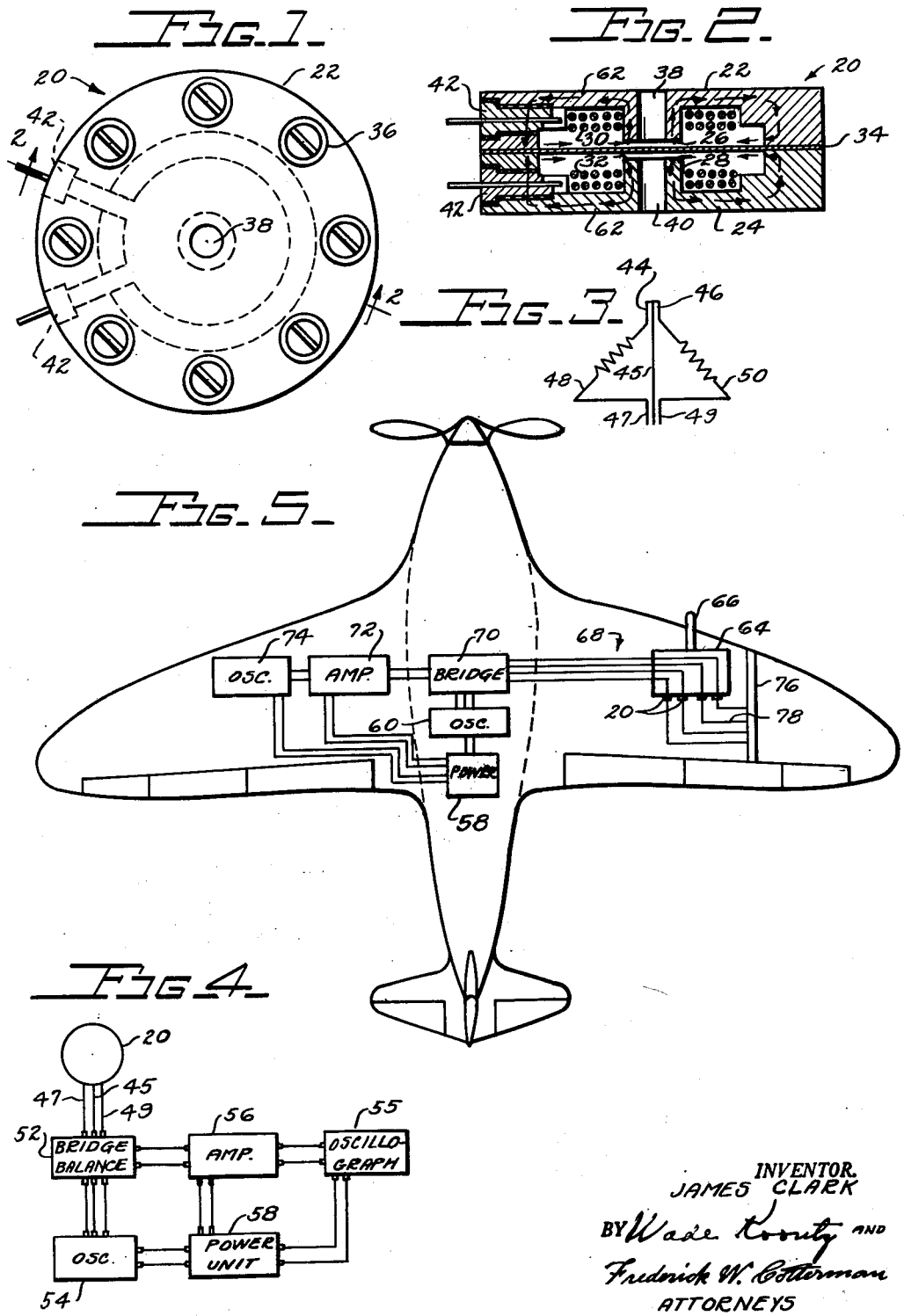
INVENTOR.
JAMES CLARK
BY Wade Koontz AND
Frederick W. Otterman
ATTORNEYS July 8, 1952  J. CLARK  2,602,329
EQUIPMENT FOR MEASURING PRESSURES NORMAL TO A BODY
Original Filed July 14, 1945  5 Sheets-Sheet 2

INVENTOR.
JAMES CLARK
BY Wade Koontz AND
Frederick W. Cotterman
ATTORNEYS

July 8, 1952  J. CLARK  2,602,329
EQUIPMENT FOR MEASURING PRESSURES NORMAL TO A BODY
Original Filed July 14, 1945  5 Sheets-Sheet 3
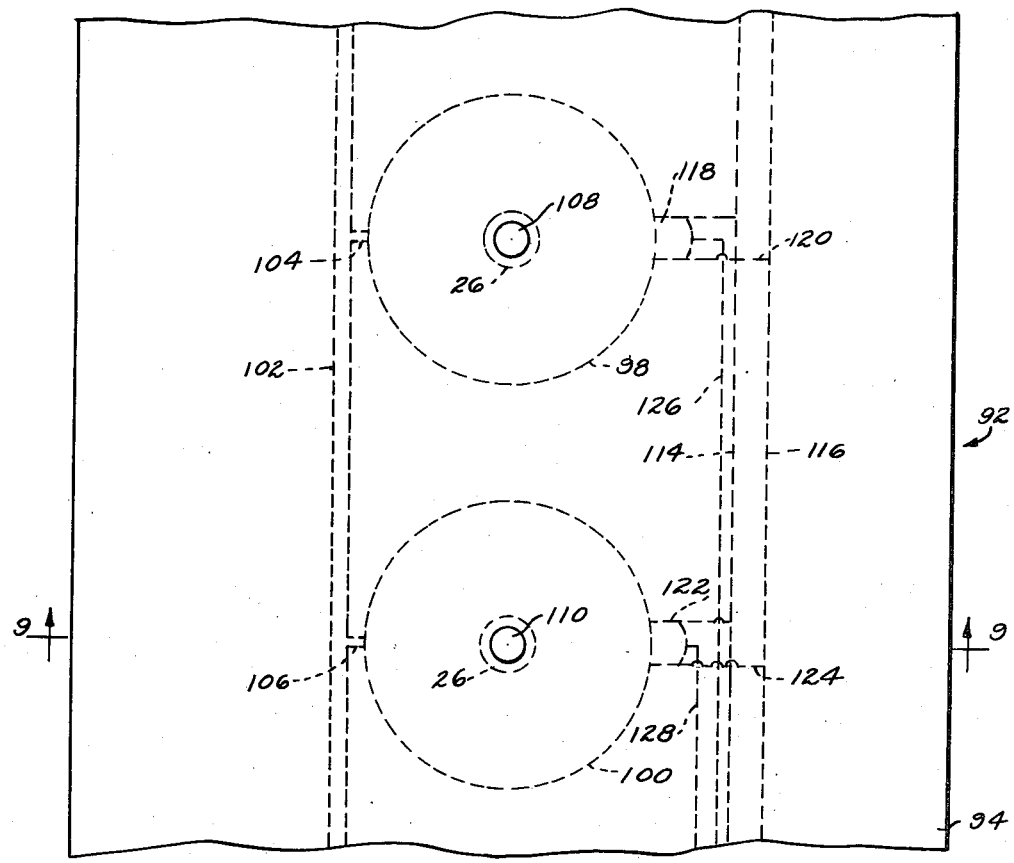
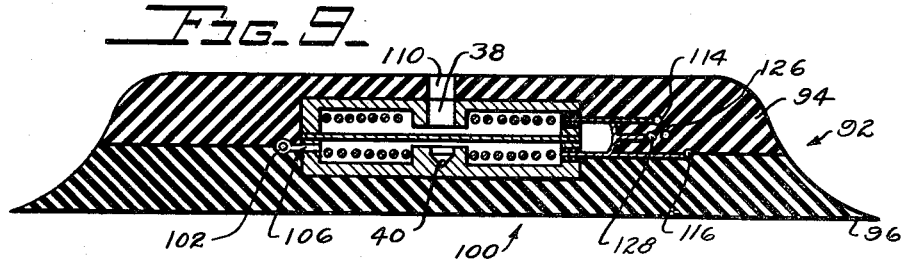
INVENTOR.
JAMES CLARK
BY Wade Koontz, AND
Frederick W. Cotterman
ATTORNEYS July 8, 1952 J. CLARK 2,602,329
EQUIPMENT FOR MEASURING PRESSURES NORMAL TO A BODY
Original Filed July 14, 1945 5 Sheets-Sheet 4
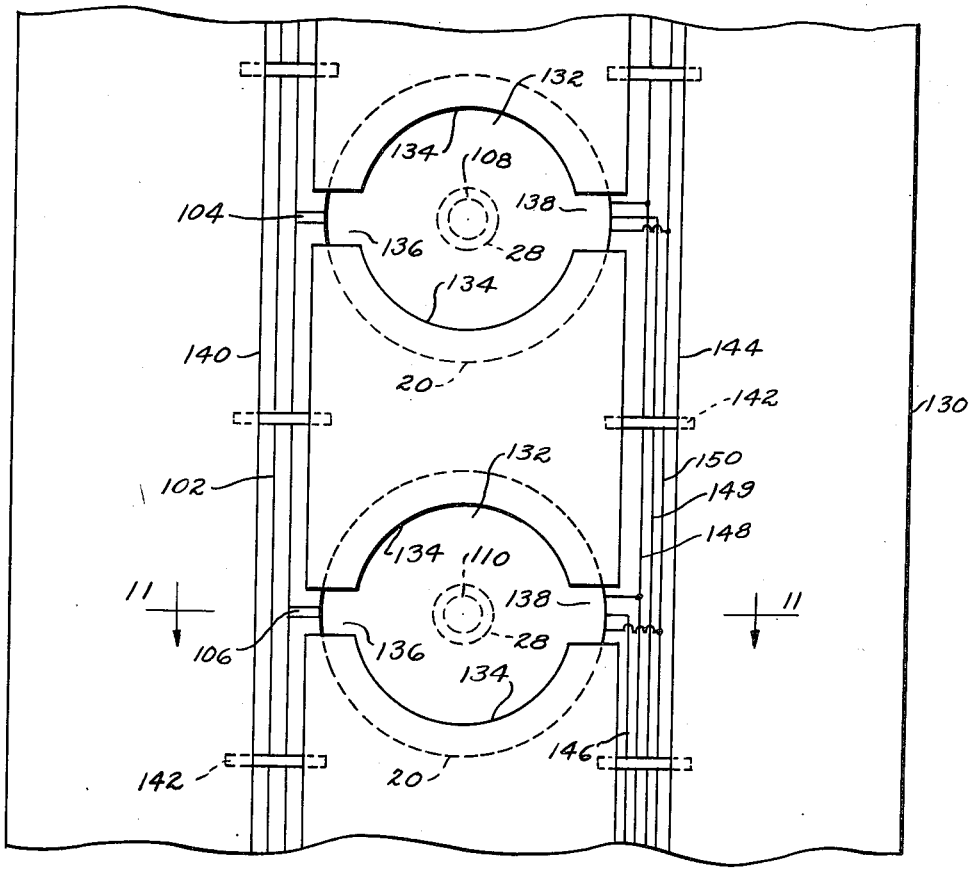
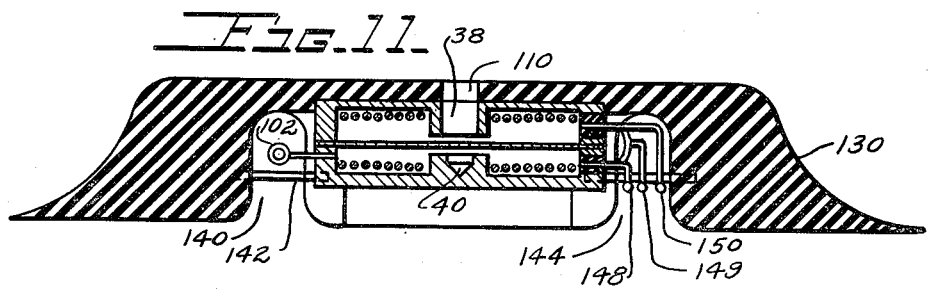
INVENTOR.
JAMES CLARK
BY Jade Koontz AND
Frederick W. Cotterman
ATTORNEYS July 8, 1952  J. CLARK  2,602,329
EQUIPMENT FOR MEASURING PRESSURES NORMAL TO A BODY
Original Filed July 14, 1945  5 Sheets-Sheet 5
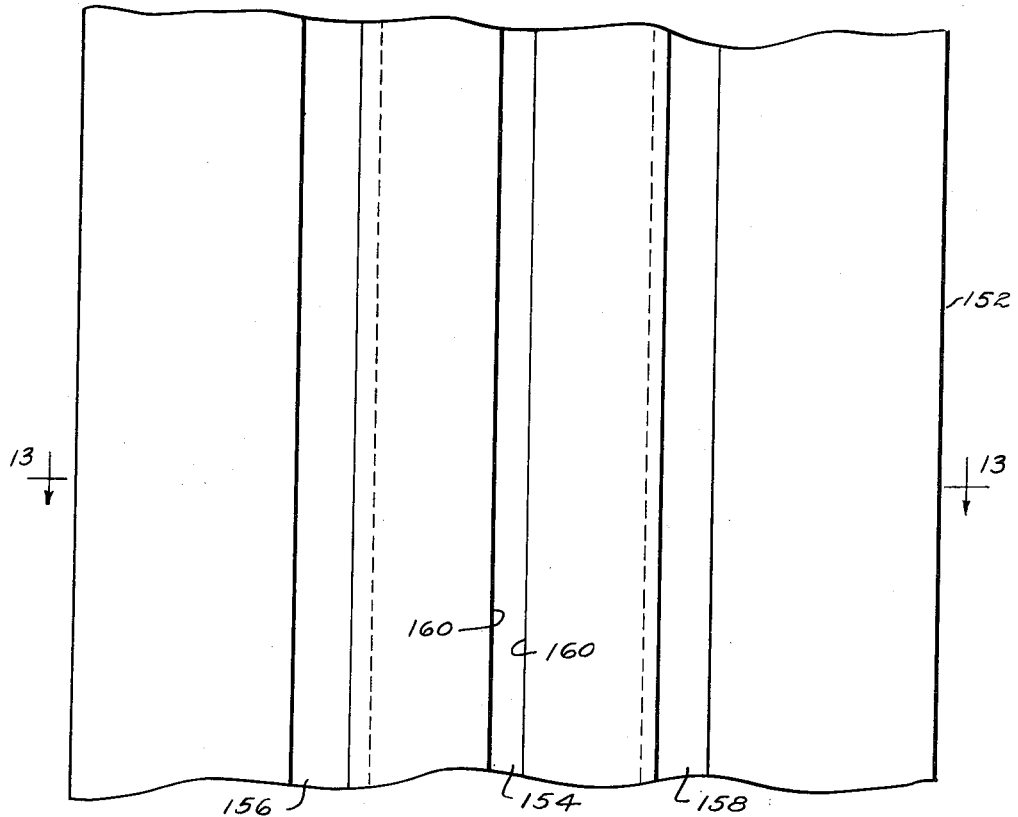
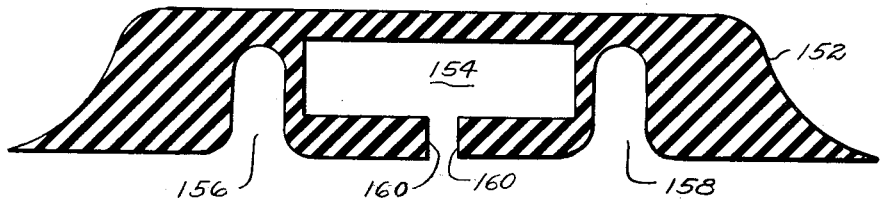
INVENTOR.
JAMES CLARK
BY Wade Coontz AND
Frederick W. Cotterman
ATTORNEYS Patented July 8, 1952

2,602,329

UNITED STATES PATENT OFFICE 2,602,329

EQUIPMENT FOR MEASURING PRESSURES NORMAL TO A BODY

James Clark, Dayton, Ohio

Original application July 14, 1945, Serial No. 605,175. Divided and this application July 23, 1947, Serial No. 763,123

3 Claims. (Cl. 73—147)

(Granted under the act of March 3, 1883, as amended April 30, 1928; 370 O. G. 757)

The invention described herein may be manufactured and used by or for the Government for governmental purposes without payment to me of any royalty thereon.

This invention is a division of my copending application Serial No. 605,175, filed July 14, 1945, now Patent No. 2,507,501, and relates to instrumentalities for receiving fluid pressures on selected surfaces of airfoils or the like, translating them into electrical phenomena, and recording them during flight.

An object of the invention is to provide means to conveniently position pressure sensitive capsules over selected surfaces of an airfoil or hydrofoil.

Other objects and advantages will be evident from the detailed description hereinafter given with reference to the drawings, wherein:

Fig. 1 is a plan view of a pressure sensitive capsule, used in carrying my invention into effect, and which operates on a change in the reluctance of a magnetic circuit, said change being caused by a change in the fluid pressure received by the device.

Fig. 2 is an axial section taken at 2—2 of Fig. 1 showing the interior construction of the capsule.

Fig. 3 is a diagram showing how the coil ends of the capsule are connected and leads brought out for connection to the associated equipment.

Fig. 4 is a schematic view of a pressure sensitive device and its associated equipment.

Fig. 5 shows the application of pressure sensitive capsules and the associated equipment of Fig. 4 to an airplane for measuring pressure distribution on the airfoils during flight.

Fig. 8 is a plan view of another form of mounting strip of rubber or similar material adapted for fastening to the surface of an airfoil and having a series of pressure sensitive capsules fastened therein.

Fig. 9 is a transverse section taken at 9—9 through the mounting strip of Fig. 8 showing a capsule permanently imbedded in the strip.

Fig. 10 is a bottom plan view of another mounting strip of rubber or similar material for fastening to an airfoil for removably holding a series of capsules.

Fig. 11 is a transverse section taken at 11—11 of Fig. 10 showing the manner of taking off the leads and the pressure connections.

Fig. 12 is a bottom plan view of still another form of mounting strip whereby the positions of the capsules are adjustable.

Fig. 13 is a transverse section taken at 13—13 of Fig. 12.

Like reference characters refer to like parts throughout the several views.

Figure 6:
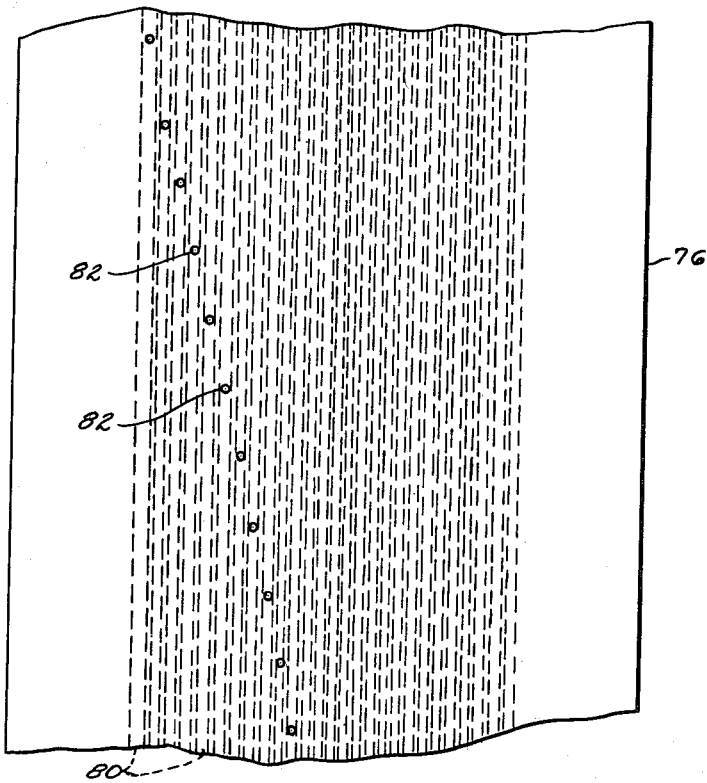
Fig. 6 is a plan view of a strip of rubber or similar material which forms part of the equipment of Fig. 5.

The pressure sensitive capsule 20 which is employed in carrying out this invention and which is shown in Figs. 1 and 2 operates on the reluctance principle. Housing parts 22 and 24 together form the housing of the capsule and at the same time serve as the magnetic elements having pole pieces 26 and 28 which carry the circular energizing coils 30 and 32 which serve as two of the arms of an A.-C. bridge. A diaphragm 34 is clamped, pressure tight, at its outer edge between housing portions 22 and 24 by screws 36. The joints between the housing parts and the diaphragms are carefully fitted whereby these joints not only insure leakage of the pressures but add a minimum of reluctance to the magnetic flux which flows through the housing parts.

Pressure tube connections 38 and 40 are provided for respectively receiving the reference pressure and the pressure to be measured. Pressure sealed terminal means 42 are provided for insulatedly conducting the four ends of the two coils through the wall of the housing for connection to the associated equipment, two coil ends 44 and 46 being connected to one lead 45 and the other two coil ends 48 and 50 being each connected to a separate lead 47 and 49, respectively, as seen in Fig. 3. When so connected, the three leads 45, 47 and 49 are adapted for connection to associated equipment shown in Fig. 4, the three leads being connected to a bridge balancing unit 52 which contains the other two arms of an A.-C. bridge, the bridge balancing unit 52 being connected to an oscillator 54 and to an amplifier 56, the output of the amplifier being fed to an oscillograph 55, all being powered by a power source 56.

The magnetic circuit in housing parts 22 and 24 is energized by the circular coils 30 and 32 respectively. The path of the flux in the two magnetic circuits is shown by the arrows 62 in Fig. 2. As shown, the coils 30 and 32 each generate a magnetic field which flows through housing parts 22 and 24 respectively and joins at the outer edge of the diaphragm. The flux of these two magnetic fields adds together in the diaphragm as it flows radially inward toward the center pole pieces 26 and 28. When the flux reaches the center of the diaphragm it separates, part entering each pole piece, and continues its path as before. The amount of flux entering a given pole piece is determined by the air gap between the diaphragm and that pole piece. When the air gap between the diaphragm and one pole piece increases and correspondingly decreases the flux flowing therethrough, the air gap between the diaphragm and the other pole piece necessarily decreases and correspondingly increases the flux in said other pole piece. It follows that variations in the pressure acting upon one side of the diaphragm, against a uniform reference pressure which is acting upon the other side of the diaphragm, will create movement of the diaphragm, which increases the flux in one magnetic circuit and decreases the flux in the other, thereby changing the inductive reactance of the coils which are arms of the A.-C. bridge. This change in reactance is reflected in the electric circuit of the bridge as a change in A.-C. resistance of the bridge arms contained in the capsule. This change in resistance of the bridge arms causes an unbalance of the bridge, thereby causing a change in amplitude of the carrier which is furnished by the oscillator.

Figure 7:
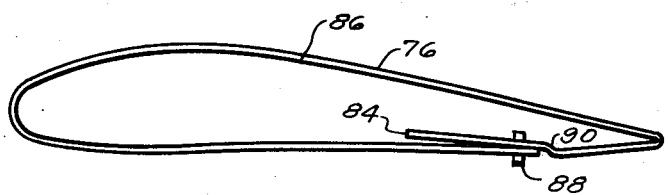
Fig. 7 is a transverse section through the airfoil of Fig. 5 showing one way in which the rubber strip shown in Fig. 6 may be attached.

Figs. 5, 6 and 7 show an application of pressure sensitive capsules 20 and associated electronic equipment shown in Fig. 4, to the wing of an airplane for measuring pressure distribution on the wing in flight. The pressure capsules 20 are mounted on a settling chamber 64 which is furnished a reference pressure by the impact or static pressure tube 66 which is connected to it. The group of A.-C. leads 68 each composed of three individual wires 45, 47, 49, extending from the capsules 20 are connected to the bridge unit 70 which must be provided with means for selectively connecting one three-wire lead at a time. The output of this bridge is amplified by amplifier 72 and recorded by the oscillograph 74, the whole being powered by a power source 58.

The unknown pressures at various points on the airplane wing are picked up by a strip 76 of rubber or similar material and taken to the pressure openings 40 of the capsules 20 by the tubes 78, the opening 38 being exposed to the static pressure within the settling chamber 64. The strip 76 is shown in detail in Fig. 6. The strip 76 being of flexible material may be cemented or otherwise fastened about various sections of the airplane shown, or about any other aerodynamic or hydrodynamic body the surface pressure upon which it is desired to obtain. The strip 76 contains a series of conduits 80 located slightly beneath the top surface. Such a structure may be formed by vulcanizing a series of rubber tubes between two sheets of rubber or the conduits may be formed directly in the strip if the strip is extruded from a suitably constructed die, various kinds of plastic being available for this purpose. Each individual conduit extends the full length of the strip and all conduits are in some manner closed at one end. Openings 82 for receiving the surface pressure at desired points on the wing may be drilled or otherwise formed in the strip to extend from the surface of the strip into the conduits. The open end of any conduit which has an opening for receiving surface pressure being then provided with a tube 78 (see Fig. 5) which connects the open end of that conduit to one of the capsules 20. One method of attaching this pressure detecting strip to the wing of an airplane is shown in Fig. 7. The strip 76 is cemented or otherwise fastened to the airplane wing 86. One end of the strip may be vulcanized shut thereby closing all of the conduits at this end, this end being held down by a retaining clamp 88. The free end of the strip is then passed around the wing and inserted in the wing through a slot 90, the tubes 78 which extend to the pressure capsules 20 being inserted and secured in the open ends 84 of the conduits. The pressures at desired points on that part of the wing covered by this strip may thus be obtained by drilling surface openings at said points, one surface opening only extending into each conduit, thus connecting the open ends of the drilled conduits each to a capsule 20. Valve means (not shown) may be provided whereby one capsule at a time may be connected to the strip for communication with the associated equipment and the pressures for a series of capsules thus recorded, one after the other, on an aircraft in flight.

In the apparatus described relative to Figs. 5, 6 and 7, the rubber strip 76 is arranged only to pick up the pressures and convey them to the pressur tubes of the pressure sensitive capsules. In Figs. 8 through 13, however, similar strips are employed except that the capsules are imbedded directly in the strips. The capsule hereinbefore described may preferably be used for this purpose.

Referring to Figs. 8 and 9, a rubber strip 92 may preferably be molded or extruded in halves 94 and 96, the halves being then vulcanized together after the capsules 98, 100, etc., are inserted. A single tube 102 has branches 104, 106 which supply the reference pressure to the individual capsules or, the lower side of the capsule to which the branch 106 extends may be evacuated or pressurized and sealed to provide a reference pressure. The pressure to be measured is admitted through openings 108 and 110 in the strip which are aligned with openings 38 in the pole pieces 26 of the capsules, the lower openings 40 in pole pieces 28 (see Fig. 2) being in this case closed. Lines 114 and 116 supply the carrier frequency to all of the capsules in a strip, leads 118—120 and 122—124 connecting the coils of a capsule to the lines. Each capsule may have one individual lead as at 126 and 128 where required. The capsules, particularly the upper surface thereof may preferably be cemented in the upper half 94 of the strip to prevent leakage of the pressure to be measured.

Another approach to the problem of mounting a series of pressure capsules in a pressure detecting strip is shown in Figs. 10 and 11. A strip 130 is extruded, molded or otherwise fabricated to the contour shown. Spaced apart pockets 132 are formed in the underside of the strip for the capsules 20, the pockets having arcuate lips 134 extending under the capsules to hold them in place, the continuity of the lips being interrupted by transverse grooves as at 136 and 138 so that the lips may be stretched back lengthwise of the strip to permit the capsules to be inserted.

A groove 140 extends lengthwise through the strip for the purpose of containing the reference pressure tube 102 where one is used, its branches 104 and 106 lying in the transverse grooves 136. Transverse pins 142, placed intermediate the capsules, support the reference pressure tube 102 and keep it in place. Where the side of the capsule which contains the reference pressure is evacuated or permanently pressurized, the reference pressure tube 102 is not needed and the groove 140 may be omitted.

A groove 144 extends lengthwise through the strip for the purpose of supporting the lead lines 146, 148, 149 and 150, transverse pins 142 being inserted underneath the lead lines to hold them in place. Holes 108 and 110 in the strip are aligned with holes 38 in the capsule to admit the pressure which is to be measured. The lower pressure opening 40 is, in this case, closed. Each capsule 20 is connected to the common leads 148 and 150 and each has an individual lead as at 146 and 149. The capsules, particularly the upper surface may preferably be cemented to the strip to avoid leakage of the pressure which is to be measured.

Still another capsule mounting means is shown in Figs. 12 and 13. A strip 152 may preferably be extruded with T slot 154 for the capsules and grooves 156 and 158 for the reference pressure tube and the leads respectively, all extending throughout the length of the strip. The lips 160 are flexible enough to be folded back for the purpose of inserting the capsules. This form of strip has the advantage of permitting the capsules to be located individually at any point within the length of the strip. Holes for supporting pins 142 as in Figs. 10 and 11 and pressure receiving holes 108 therein shown must, however, be drilled at the selected capsule stations.

By following the rules of design herein disclosed, the resonant frequency of the seismic system of the pressure sensitive capsules may be made sufficiently high to be well above the frequency of any pulsating pressure encountered in flight, or in wind tunnel or hydraulic work.

The equipment herein disclosed is applicable to many other situations not hereinbefore mentioned. By appropriate design and application, the instantaneous pressures in the combustion chambers of rockets may be evaluated. It may be used in aerodynamic work to obtain steady, pulsating and transient pressures in fans, blowers, compressors, etc. It has proven useful in determining the flow characteristics about and adjacent to aerodynamic bodies. It is valuable as an aid in studying turbulence in air and hydraulic flows. It has been used to advantage in physiology studies to record instantaneous pressures in oxygen masks and associated equipment in order to appraise their characteristics for high altitude flight. It has been employed in physiology studies for accurately recording the instantaneous blood pressure as an aid in studying heart action under various conditions.

Having described my invention, I claim:

1. Apparatus for measuring the instantaneous pressure normal to the surface of a body, due to movement of a fluid stream relative thereto, at a series of selected points on said surface, said apparatus comprising, in combination, a flexible strip adapted for attachment to said surface, said strip having a longitudinally extended passageway containing a series of longitudinally spaced pressure sensitive capsules, a conduit imbedded in said strip extending parallel to and adjacent said passageway and having branches extending to said capsules, and pressure measuring passageways normal to said surface, extending through said strip to subject said capsules to the pressure normal to the surface of the body.

2. Apparatus for measuring the instantaneous pressure normal to the surface of a body, due to movement of a fluid relative thereto, at a series of selected points on said surface, said apparatus comprising, in combination, a flexible strip adapted for attachment to said surface, a series of longitudinally spaced chambers formed in the underside of said strip for holding pressure sensitive capsules, said chambers having arcuate lips extending on the underside of a capsule for holding it in place but being adapted to be spread apart to allow said capsules to be inserted, said strip having a longitudinally disposed groove formed in the underside adapted for containing a conduit with lateral grooves for the lateral branches extending to said chambers, and another longitudinally disposed groove formed in the underside, adapted for containing electrical conductors with lateral grooves for the lateral branches extending to said chambers, removable supports for holding the conduit and the conductors in place, and a passageway in said strip normal to the surface for subjecting the external pressure to the capsules.

3. In an apparatus for measuring the instantaneous pressure normal to the surface of a body due to movement of a fluid relative thereto, at any desired point on said surface with pressure sensitive capsules, a flexible strip adapted for attachment to said surface, said strip having a T slot, the head of the T portion of which is of a cross section to slidably receive one of said capsules with its axis normal to said surface, and two longitudinal grooves in the underside of said strip one for containing reference pressure tubes and the other for containing the electrical lines for conveying current to and from the capsules.

JAMES CLARK.

REFERENCES CITED

The following references are of record in the file of this patent:

UNITED STATES PATENTS

| Number | Name | Date |
|---|---|---|
| 1,405,177 | Zahm | Jan. 31, 1922 |
| 2,428,234 | Mapp | Sept. 30, 1947 |
| 2,440,198 | Green | Apr. 20, 1948 |

FOREIGN PATENTS

| Number | Country | Date |
|---|---|---|
| 7,479 | Great Britain | Mar. 27, 1913 |